(12) United States Patent
Freitag et al.

(10) Patent No.: US 7,082,017 B2
(45) Date of Patent: Jul. 25, 2006

(54) HIGH MAGNETORESISTANCE SPIN VALVE SENSOR WITH SELF-PINNED ANTIPARALLEL (AP) PINNED LAYER STRUCTURE

(75) Inventors: James Mac Freitag, San Jose, CA (US); Hardayal Singh Gill, Palo Alto, CA (US); Mustafa Pinarbasi, Morgan Hill, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 242 days.

(21) Appl. No.: 10/833,213

(22) Filed: Apr. 26, 2004

(65) Prior Publication Data

US 2004/0264069 A1  Dec. 30, 2004

Related U.S. Application Data

(62) Division of application No. 10/104,712, filed on Mar. 21, 2002, now Pat. No. 6,751,072.

(51) Int. Cl.
*G11B 5/39* (2006.01)

(52) U.S. Cl. .................................. 360/324.11

(58) Field of Classification Search .......... 360/324.11, 360/324.1, 324.12
See application file for complete search history.

(56) References Cited

U.S. PATENT DOCUMENTS 6,313,973 B1 * 11/2001 Fuke et al. ............... 360/324.1
6,469,926 B1 * 10/2002 Chen ........................ 365/158
6,751,072 B1 * 6/2004 Freitag et al. ......... 360/324.11

* cited by examiner

*Primary Examiner*—Angel Castro
(74) *Attorney, Agent, or Firm*—Lewis L. Nunnelley; Matthew S. Zises (57) ABSTRACT

A spin valve sensor includes a spacer layer which is located between a free layer and an antiparallel (AP) pinned layer structure wherein the AP pinned layer structure includes an antiparallel coupling layer which is located between and interfaces first and second AP pinned layers with the second AP pinned layer interfacing the spacer layer. Each of the first and second AP pinned layers is composed of cobalt iron (CoFe) wherein the iron (Fe) content in the cobalt iron (CoFe) of one of the first and second AP pinned layers is greater than the iron (Fe) content in the cobalt iron (CoFe) in the other one of the first and second AP pinned layers.

10 Claims, 10 Drawing Sheets

FIG. 9 (PRIOR ART)
(ABS)

HIGH MAGNETORESISTANCE SPIN VALVE SENSOR WITH SELF-PINNED ANTIPARALLEL (AP) PINNED LAYER STRUCTURE

This is a division of application Ser. No. 10/104,712, now U.S. Pat. No. 6,751,072.

BACKGROUND OF THE INVENTION

1. Field of the Invention

The present invention relates to a high magnetoresisitance spin valve sensor with a self-pinned AP pinned layer structure and, more particularly, to an AP pinned layer structure wherein AP pinned layers employ different materials for optimizing a magnetoresistive coefficient dr/R and for self-pinning one another.

2. Description of the Related Art

The heart of a computer is a magnetic disk drive which includes a rotating magnetic disk, a slider that has write and read heads, a suspension arm above the rotating disk and an actuator arm. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the actuator arm swings the suspension arm to place the write and read heads over selected circular tracks on the rotating disk where field signals are written and read by the write and read heads. The write and read heads are connected to processing circuitry that operates according to a computer program to implement the writing and reading functions.

An exemplary high performance read head employs a spin valve sensor for sensing the magnetic field signals from the rotating magnetic disk. The sensor includes a nonmagnetic electrically conductive first spacer layer sandwiched between a ferromagnetic pinned layer structure and a ferromagnetic free layer structure. An antiferromagnetic pinning layer typically interfaces the pinned layer structure for pinning a magnetic moment of the pinned layer structure 90° to the air bearing surface (ABS) wherein the ABS is an exposed surface of the sensor that faces the magnetic disk. First and second leads are connected to the spin valve sensor for conducting a sense current therethrough. A magnetic moment of the free layer structure is free to rotate upwardly and downwardly with respect to the ABS from a quiescent or bias point position in response to positive and negative magnetic field signals from the rotating magnetic disk. The quiescent position, which is preferably parallel to the ABS, is the position of the magnetic moment of the free layer structure with the sense current conducted through the sensor in the absence of field signals.

The thickness of the spacer layer is chosen so that shunting of the sense current and a magnetic coupling between the free and pinned layer structures are minimized. This thickness is typically less than the mean free path of electrons conducted through the sensor. With this arrangement, a portion of the conduction electrons are scattered at the interfaces of the spacer layer with the pinned and free layer structures. When the magnetic moments of the pinned and free layer structures are parallel with respect to one another scattering is minimal and when their magnetic moments are antiparallel scattering is maximized. Changes in scattering changes the resistance of the spin valve sensor as a function of cos θ, where θ is the angle between the magnetic moments of the pinned and free layer structures. The sensitivity of the sensor is quantified as magnetoresistive coefficient dr/R where dr is the change in the resistance of the sensor as the magnetic moment of the free layer structure rotates from a position parallel with respect to the magnetic moment of the pinned layer structure to an antiparallel position with respect thereto and R is the resistance of the sensor when the magnetic moments are parallel.

In addition to the spin valve sensor the read head includes nonconductive nonmagnetic first and second read gap layers and ferromagnetic first and second shield layers. The spin valve sensor is located between the first and second read gap layers and the first and second read gap layers are located between the first and second shield layers. In the construction of the read head the first shield layer is formed first followed by formation of the first read gap layer, the spin valve sensor, the second read gap layer and the second shield layer. Spin valve sensors are classified as a top spin valve sensor or a bottom spin valve; sensor depending upon whether the pinning layer is located near the bottom of the sensor close to the first read gap layer or near the top of the sensor close to the second read gap layer. Spin valve sensors are further classified as simple pinned or antiparallel (AP) pinned depending upon whether the pinned layer structure is one or more ferromagnetic layers with a unidirectional magnetic moment or a pair of ferromagnetic AP layers that are separated by a coupling layer with magnetic moments of the ferromagnetic AP layers being antiparallel to one another. Spin valve sensors are still further classified as single or dual wherein a single spin valve sensor employs only one pinned layer structure and a dual spin valve sensor employs two pinned layer structures with the free layer structure located therebetween.

As stated hereinabove, a magnetic moment of the aforementioned pinned layer structure is pinned 90° to the ABS by the aforementioned antiferromagnetic (AFM) pinning layer. After deposition of the sensor, the sensor is subjected to a temperature at or near a blocking temperature of the material of the pinning layer in the presence of a field which is oriented perpendicular to the ABS for the purpose of resetting the orientation of the magnetic spins of the pinning layer. The elevated temperature frees the magnetic spins of the pinning layer so that they align perpendicular to the ABS. This also aligns the magnetic moment of the pinned layer structure perpendicular to the ABS. When the read head is cooled to ambient temperature the magnetic spins of the pinning layer are fixed in the direction perpendicular to the ABS which pins the magnetic moment of the pinned layer structure perpendicular to the ABS. After resetting the pinning layer it is important that subsequent elevated temperatures and extraneous magnetic fields do not disturb the setting of the pinning layer. It is also desirable that the pinning layer be as thin as possible since it is located within the track width of the sensor and its thickness adds to an overall gap length between the first and second shield layers. It should be understood that the thinner the gap length the higher the linear read bit density of the read head. This means that more bits can be read per inch along the track of a rotating magnetic disk which enables an increase in the storage capacity of the magnetic disk drive.

A scheme for minimizing the aforementioned gap between the first and second shield layers is to provide a self-pinned AP pinned layer structure. The self-pinned AP pinned layer structure eliminates the need for the aforementioned pinning layer which permits the read gap to be reduced by 150 Å when the pinning layer is platinum manganese (PtMn). In the self-pinned AP pinned layer structure each AP pinned layer has an intrinsic uniaxial anisotropy field and a magnetostriction uniaxial anisotropy field. The intrinsic uniaxial anisotropy field is due to the intrinsic magnetization of the layer and the magnetostriction uniaxial anisotropy field is a product of the magnetostriction of the layer and stress within the layer. A positive magnetostriction of the layer and compressive stress therein to the ABS results in a magnetostriction uniaxial anisotropy field that can support an intrinsic uniaxial anisotropy field. The orientations of the magnetic moments of the AP pinned layers are set by an external field. This is accomplished without the aforementioned elevated temperature which is required to free the magnetic spins of the pinning layer.

If the self-pinning of the AP pinned layer structure is not sufficient, unwanted extraneous fields can disturb the orientations of the magnetic moments of the AP pinned layers or, in a worst situation, could reverse their directions. Accordingly, there is a strong-felt need to maximize the uniaxial magnetostriction anisotropy field while maintaining a high magnetoresistive coefficient dr/R of the spin valve sensor.

SUMMARY OF THE INVENTION

The present invention employs cobalt iron (CoFe) for each of the first and second AP pinned layers in a self-pinned AP pinned layer structure, however, the iron (Fe) content in the cobalt iron (CoFe) in the first and second AP pinned layers is different for improving the magnetostriction uniaxial anisotropy field while maintaining a high magnetoresistive coefficient dr/R. In a broad aspect of the invention the iron content in the cobalt iron (CoFe) of one of the first and second AP pinned layers is greater than the iron content in the cobalt iron (CoFe) in the other of the first and second AP pinned layers. In one embodiment of the invention the iron content, in the cobalt iron (CoFe) in the first AP pinned layer, which does not interface the spacer layer, is greater than the iron content in the cobalt iron (CoFe) in the second AP pinned layer which interfaces the spacer layer. One of our experiments shows that when the content of the first AP pinned layer comprises $Co_{60}Fe_{40}$ and the content of the second AP pinned layer" comprises $Co_{90}Fe_{10}$ the magnetostriction uniaxial anisotropy field is significantly improved while maintaining a high magnetoresistive coefficient dr/R.

In another embodiment of the invention the iron content in the cobalt iron (CoFe) in the second AP pinned layer is greater than the iron content in the cobalt iron (CoFe) in the first AP pinned layer. In still another one of our experiments the second AP pinned layer included a second film which is located between first and third films wherein the iron content in the cobalt iron (CoFe) in the second film was greater than the iron content in the cobalt iron (CoFe) in each of the first and third films. In this experiment the content of the second film comprised $Co_{60}Fe_{40}$ and the content of each of the first and third films comprised $Co_{90}Fe_{10}$. From these experiments a still further embodiment is derived wherein the first AP pinned layer comprises $Co_{60}Fe_{40}$ and the second AP pinned layer comprises the aforementioned first, second and third films.

An object of the present invention is to provide a spin valve sensor with a self-pinned AP pinned layer structure wherein the self-pinning and amplitude output are improved while maintaining a high magnetoresistive coefficient dr/R.

Another object is to provide a method of making the aforementioned spin valve sensor.

Other objects and attendant advantages of the invention will be appreciated upon reading the following description taken together with the accompanying drawings.

DESCRIPTION OF THE PREFERRED EMBODIMENTS

Magnetic Disk Drive

Figure 1:
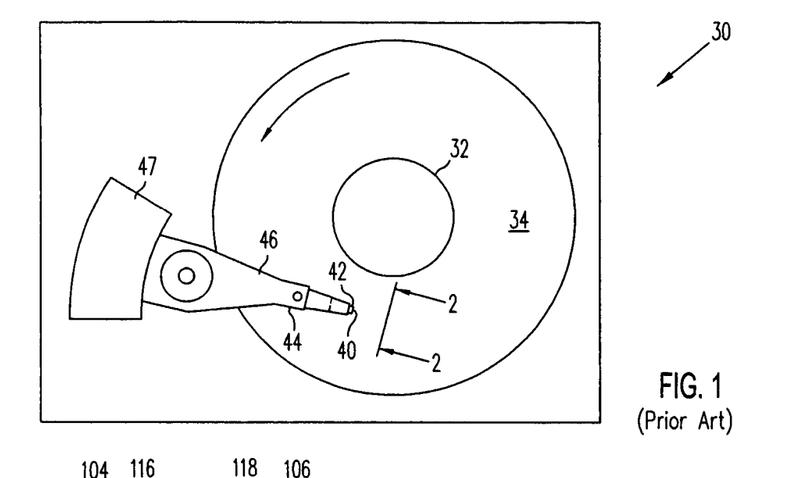
FIG. 1 is a plan view of an exemplary magnetic disk drive.
Figures 2, 3:
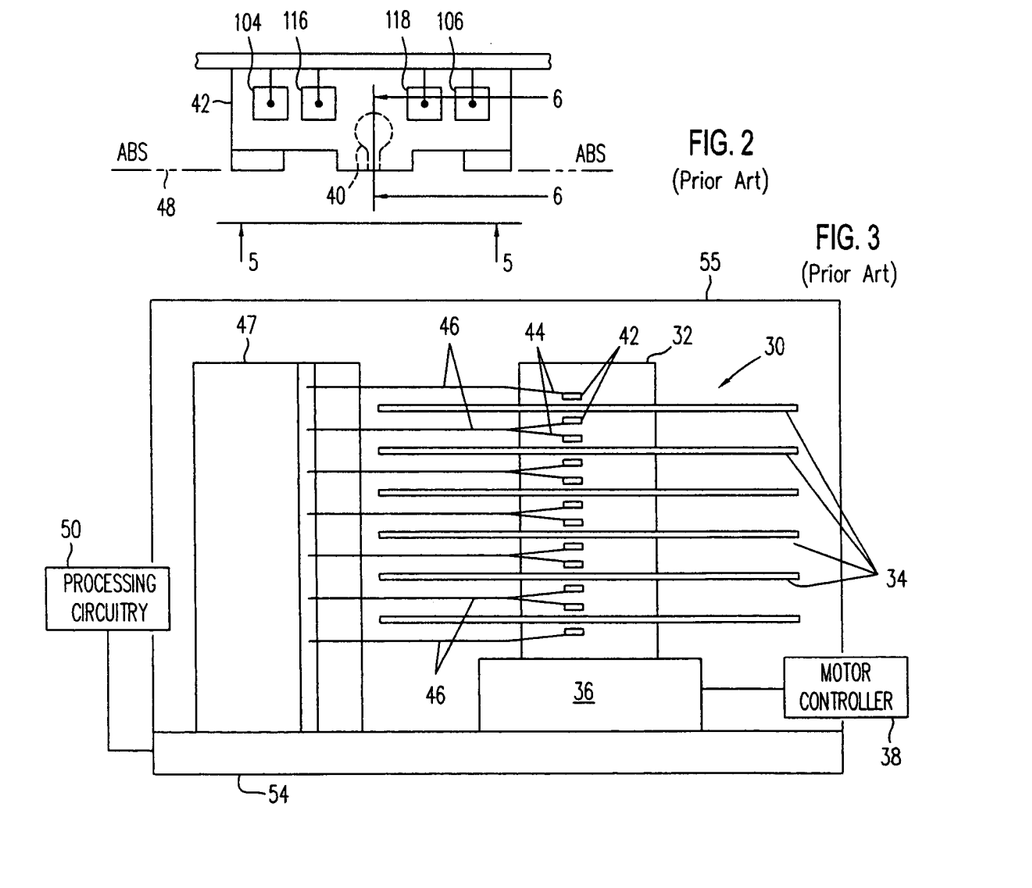
FIG. 2 is an end view of a slider with a magnetic head of the disk drive as seen in plane 2—2 of FIG. 1.
FIG. 3 is an elevation view of the magnetic disk drive wherein multiple disks and magnetic heads are employed.
Figure 4:
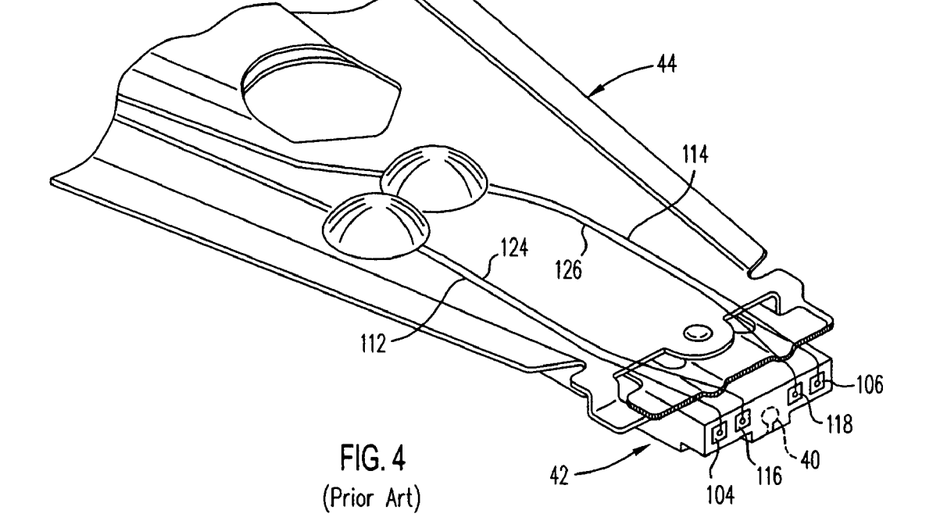
FIG. 4 is an isometric illustration of an exemplary suspension system or supporting the slider and magnetic head.

Referring now to the drawings wherein like reference numerals designate like or similar parts throughout the several views, FIGS. 1–3 illustrate a magnetic disk drive 30. The drive 30 includes a spindle 32 that supports and rotates a magnetic disk 34. The spindle 32 is rotated by a spindle motor 36 that is controlled by a motor controller 38. A slider 42 has a combined read and write magnetic head 40 ant is supported by a suspension 44 and actuator arm 46 that is rotatably positioned by an actuator 47. A plurality of disks, sliders and suspensions may be employed in a large capacity direct access storage device (DASD) as shown in FIG. 3. The suspension 44 and actuator arm 46 are moved by the actuator 47 to position the slider 42 so that the magnetic head 40 is in a transducing relationship with a surface of the magnetic disk 34. When the disk 34 is rotated by the spindle motor 36 the slider is supported on a thin (typically, 0.01 μm) cushion of air (air bearing) between the surface of the disk 34 and the air bearing surface (ABS) 48. The magnetic head 40 may then be employed for writing information to multiple circular tracks on the surface of the disk 34, as well as for reading information therefrom. Processing circuitry 50 exchanges signals, representing such information, with the head 40, provides spindle motor drive signals for rotating the magnetic disk 34, and provides control signals to the actuator for moving the slider to various tracks. In FIG. 4 the slider 42 is shown mounted to a suspension 44. The components described hereinabove may be mounted on a frame 54 of a housing 55, as shown in FIG. 3.

Figure 5:
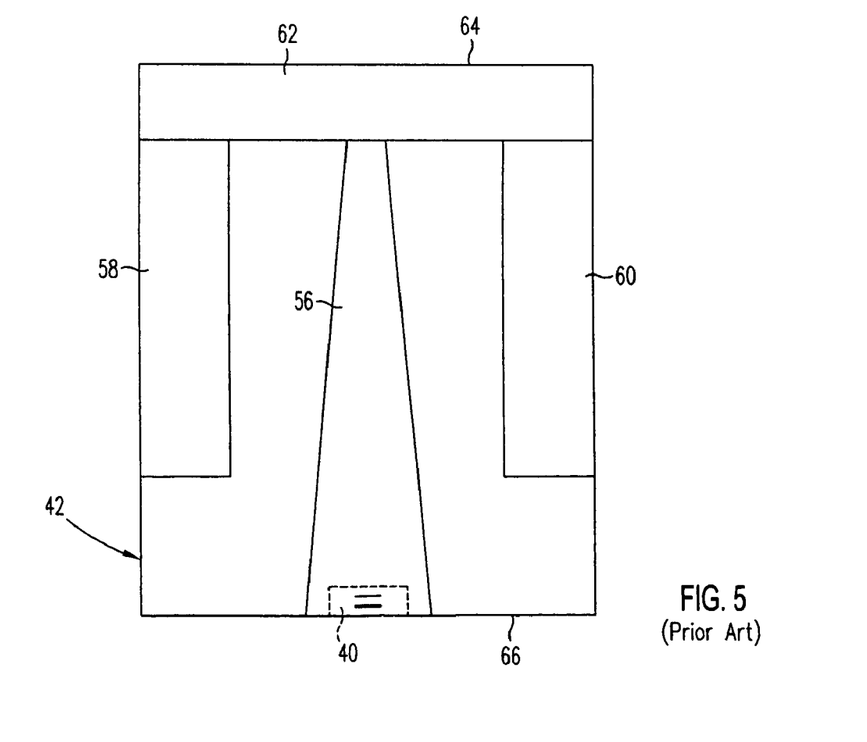
FIG. 5 is an ABS view of the magnetic head taken along plane 5—5 of FIG. 2.

FIG. 5 is an ABS view of the slider 42 and the magnetic head 40. The slicer has a center rail 56 that supports the magnetic head 40, and side rails 58 and 60. The rails 56, 58 and 60 extend from a cross rail 62. With respect to rotation of the magnetic disk 34, the cross rail 62 is at a leading edge 64 of the slider and the magnetic head 40 is at a trailing edge 66 of the slider.

Figure 6:
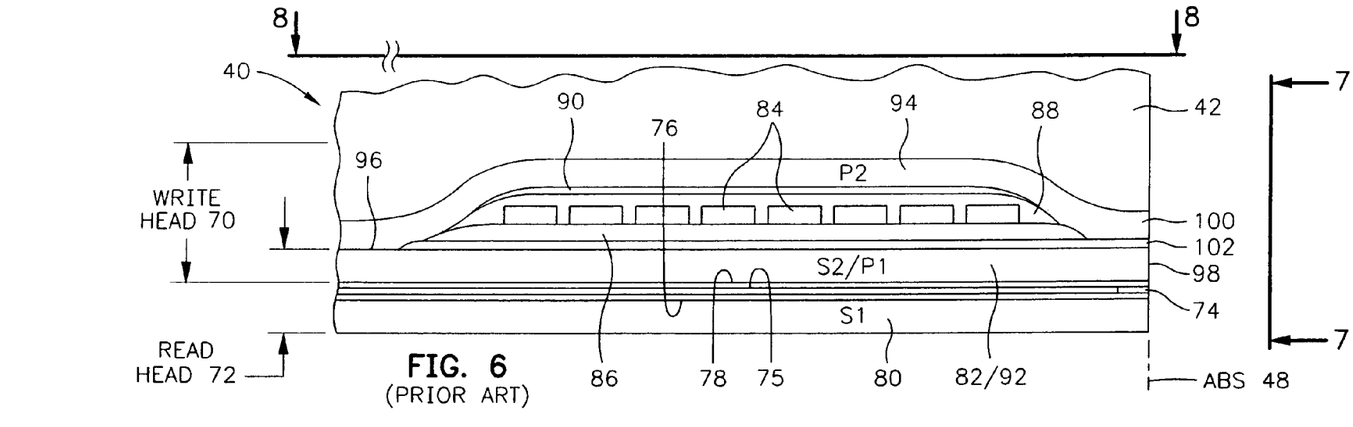
FIG. 6 is a partial view of the slider and a merged magnetic head as seen in plane 6—6 of FIG. 2.
Figure 7:
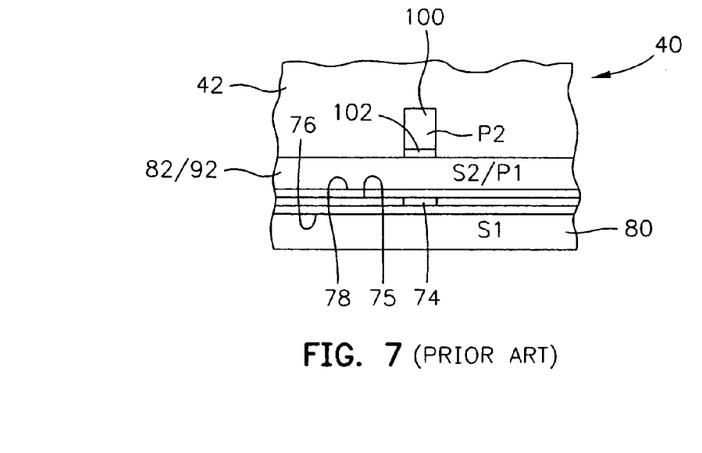
FIG. 7 is a partial ABS view of the slider taken along plane 7—7 of FIG. 6 to show the read and write elements of the merged magnetic head.

FIG. 6 is a side cross-sectional elevation view of a merged magnetic head 40, which includes a write head portion 70 and a read head portion 72, the read head portion employing a spin valve sensor 74 of the present invention. FIG. 7 is an ABS view of FIG. 6. The spin valve sensor 74 is sandwiched between nonmagnetic electrically insulative first and second read gap layers 76 and 78, and the read gap layers are sandwiched between ferromagnetic first and second shield layers 80 and 82. In response to external magnetic fields, the resistance of the spin valve sensor 74 changes. A sense current is conducted through the sensor causes these resistance changes to be manifested as potential changes. These potential changes are then processed as readback signals by the processing circuitry 50 shown in FIG. 3.

Figure 8:
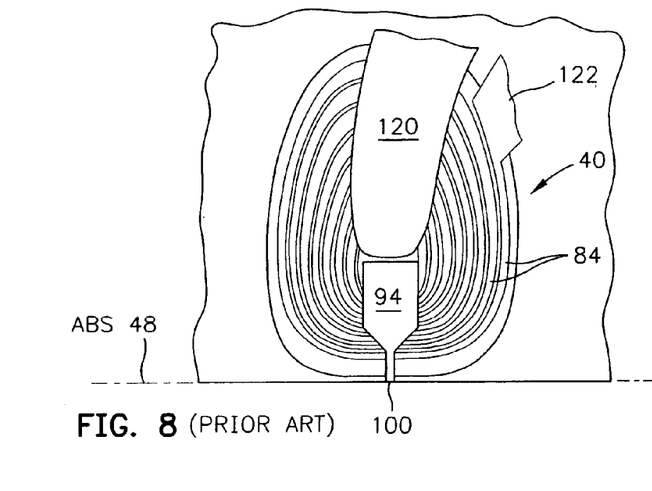
FIG. 8 is a view taken along plane 8—8 of FIG. 6 with all material above the coil layer and leads removed.

The write head portion 70 of the magnetic head 40 includes a coil layer 84 which is sandwiched between first and second insulation layers 86 and 88. A third insulation layer 90 may be employed for planarizing the head to eliminate ripples in the second insulation layer caused by the coil layer 84. The first, second and third insulation layers are referred to in the art as an "insulation stack". The coil layer 84 and the first, second and third insulation layers 86, 88 and 90 are sandwiched between first and second pole piece layers 92 and 94. The first and second pole piece layers 92 and 94 are magnetically coupled at a back gap 96 and have first and second pole tips 98 and 100 which are separated by a write gap layer 102 at the ABS. Since the second shield layer 82 and the first pole piece layer 92 are a common layer this head is known as a merged head. In a piggyback head (not shown) the layers 82 and 92 are separate layers and are separated by an insulation layer. As shown in FIGS. 2 and 4, first and second solder connections 104 and 106 connect leads from the spin valve sensor 74 to leads 112 and 114 on the suspension 44, and third and fourth solder connections 116 and 118 connect leads 120 and 122 from the coil 84 (see FIG. 8) to leads 124 and 126 on the suspension.

Figure 9:
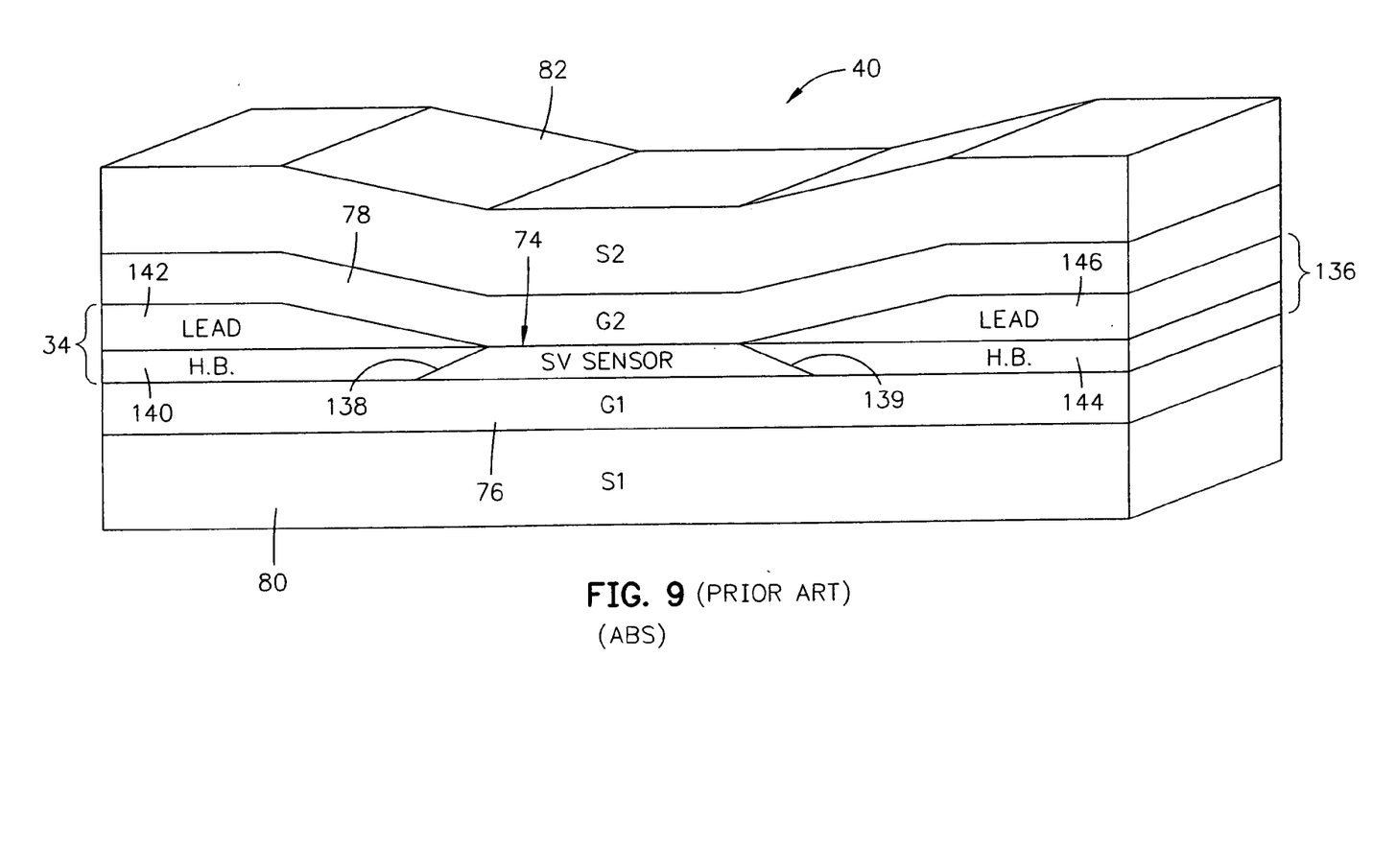
FIG. 9 is an enlarged isometric ABS illustration of the read head with a prior art spin valve sensor.

FIG. 9 is an isometric ABS illustration of the read head 40 shown in FIG. 7. The read head 40 includes the spin valve sensor 74. First and second hard bias and lead layers 134 and 136 are connected to first and second side edges 138 and 139 of the spin valve sensor. This connection is known in the art as a contiguous junction and is fully described in commonly assigned U.S. Pat. No. 5,018,037. The first hard bias and lead layers 134 include a first hard bias layer 140 and a first lead layer 142 and the second hard bias and lead layers 136 include a second hard bias layer 144 and a second lead layer 146. The hard bias layers 140 and 144 cause magnetic fields to extend longitudinally through the spin valve sensor 74 for stabilizing the magnetic domains therein. The spin valve sensor 74 and the first and second hard bias and lead layers 134 and 136 are located between the nonmagnetic electrically insulative first and second read gap layers 76 and 78 and the first and second read gap layers 76 and 78 are, in turn, located between the ferromagnetic first and second shield layers 80 and 82.

Examples

Examples 1–5 were tested at, the coupon level and Examples 1 and 2 were further tested at the row level. At the coupon level a single sensor is fabricated on a glass substrate and is not lapped to the ABS. Since lapping causes the aforementioned ABS compressive stress the ABS compressive stress due to lapping is not present at the coupon level. The row level is a row of read heads including their read sensors and is taken from a slider substrate where rows and columns of such read heads have been fabricated. After dicing the row of read heads from the slider substrate, the row is lapped to the ABS which causes the aforementioned compressive stress.

At the coupon level the magnetoresistive coefficient dr/R, the intrinsic uniaxial anisotropy field $H_{Ki}$, the magnetostriction $\lambda$ (AP) of the AP pinned layers, the magnetostriction uniaxial anisotropy field $H_{K\lambda}$, the resistance of the sensor $R_S$ and the magnetostriction of the free layer $\lambda$ (FL) were determined and/or calculated. At the row level Examples 1 and 2 were tested for amplitude output.

Example 1

Figure 10:
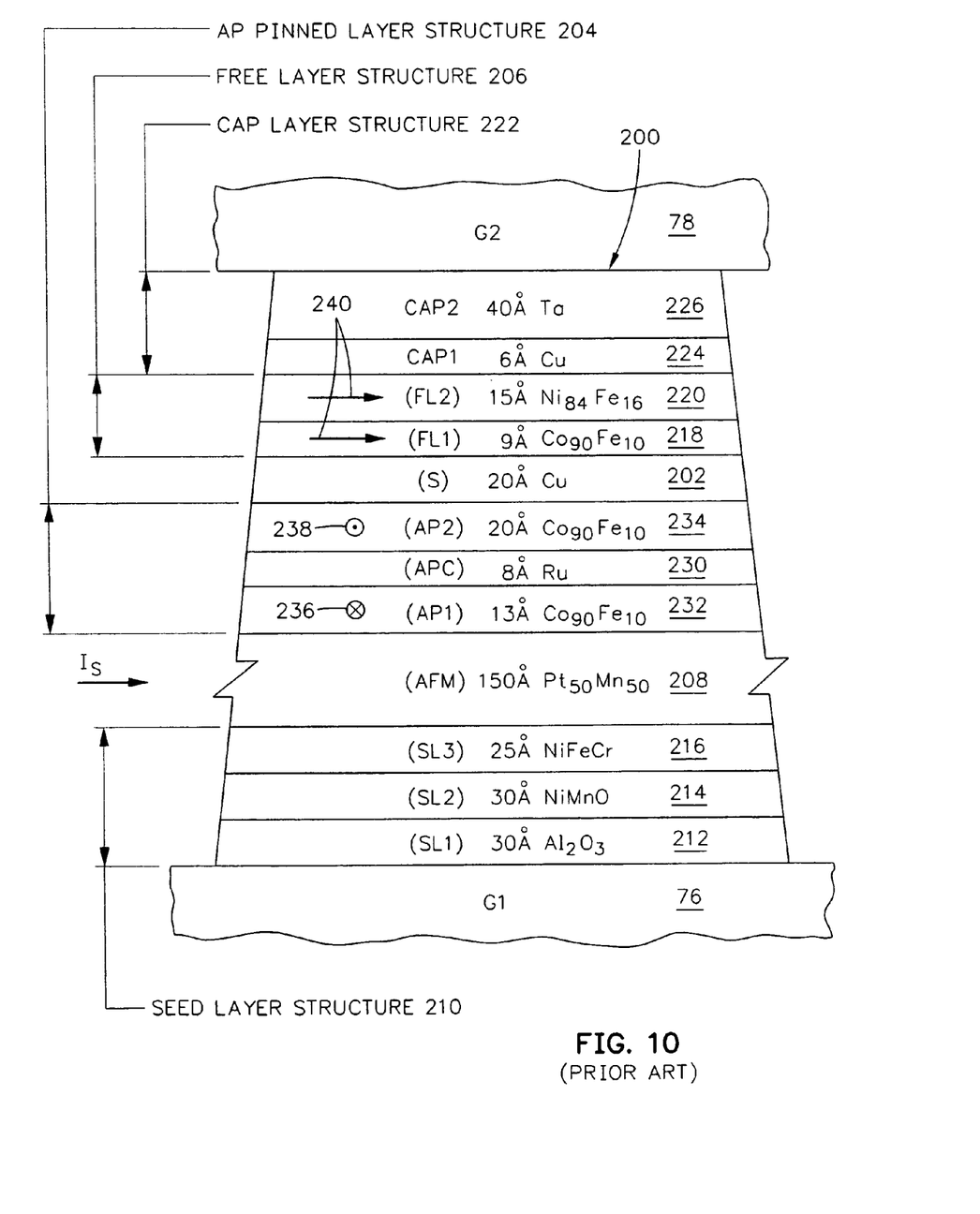
FIG. 10 is an ABS view of a prior art spin valve sensor which employs a pinning layer for pinning magnetic moments of an AP pinned layer structure.

A prior art spin valve sensor 200, as shown in FIG. 10, was built and tested. The spin valve sensor includes a spacer layer (S) 202 which is located between an AP pinned layer structure 204 and a free layer structure 206. An antiferromagnetic (AFM) pinning layer 208 interfaces the AP pinned layer structure 204 and pins magnetic moments therein, which will be described in more detail hereinafter. A seed layer structure 210, which includes first, second and third seed layers (SL1), (SL2) and (SL3) 212, 214 and 216, interfaces the pinning layer 208 and is composed of materials which promote a desirable texture of the layers deposited thereon. The free layer structure 206 includes first and second free layers (FL1) and (FL2) 218 and 220. It has been found that when the first free layer 218 is composed of cobalt iron (CoFe) that there is an improvement in the magnetoresistive coefficient dr/R of the spin valve sensor. A cap layer structure 222 is provided on top of the free layer structure 206 for protecting it from subsequent processing steps. The cap layer structure may include first and second cap layers (CAP1) and (CAP2) 224 and 226. Again, when the first cap layer 224 is composed of copper (Cu) it has been found t hat there is an increase in magnetoresistive coefficient dr/R.

The AP pinned layer structure 204 includes an antiparallel coupling layer (APC) 230 which is located between first and second AP pinned layers (AP1) and (AP2) 232 and 234. The pinning layer 208 interfaces the first AP pinned layer 232 and pins a magnetic moment 236 of the first AP pinned layer perpendicular to the ABS in a direction out of the sensor or into the sensor, as shown in FIG. 10. By a strong antiparallel coupling between the first and second AP pinned layers 232 and 234 the magnetic moment 238 of the second AP pinned layer 234 is antiparallel to the magnetic moment 236. The free layer structure 206 has a magnetic moment 240 which is parallel to the ABS in a direction from right to left or from left to right, as shown in FIG. 10. A sense current $I_S$ is conducted through the sensor parallel to the major planes of the thin film layers in a direction from right to left or from left to right, as shown in FIG. 10. When a field signal from the rotating magnetic disk 34 in FIG. 1 rotates the magnetic moment 240 of the free layer structure into the sensor the magnetic moments 240 and 238 become more antiparallel which increases the resistance of the spin valve sensor to the sense current $I_S$ and when a field signal from the rotating magnetic disk rotates the magnetic moment 240 out of the sensor the magnetic moments 240 and 238 become more parallel which reduces the resistance of the spin valve sensor to the sense current $I_S$. These resistance changes are processed as playback signals by the processing circuitry 50 in FIG. 3.

The thicknesses and materials of the layers of the prior art sensor built and tested were 30 Å of $Al_2O_3$ for layer 212, 30 Å of NiMnO for the layer 214, 25 Å of NiFeCr for the layer 216, 150 Å of $Pt_{50}Mn_{50}$ for the layer 208, 13 Å of $Co_{90}Fe_{10}$ for the layer 232, 8 Å of Ru for the layer 230, 20 Å of $Co_{90}Fe_{10}$ for the layer 234, 20 Å of Cu for the layer 202, 9 Å of $Co_{90}Fe_{10}$ for the layer 218, 15 Å of $Ni_{84}Fe_{16}$ for the layer 220, 6 Å of Cu for the layer 224 and 40 Å of Ta for the layer 226.

In a first test of Example 1 the example was tested at a coupon level. The results were that the prior art spin valve sensor 200 had a desirable high magnetoresistive coefficient dr/R of 9.16%. The net intrinsic uniaxial anisotropy field $H_{Ki}$ was 30 Oe perpendicular to the ABS. The magnetostriction $M_S$ of the AP pinned layers was +1.5E-05. It is desirable that the magnetostriction $M_S$ be positive so that this, in combination with compressive stress in the head, will result in a magnetostriction uniaxial anisotropy field which is oriented perpendicular to the ABS. The magnetostriction uniaxial anisotropy field $H_{K\lambda}$ of each AP pinned layer was about 300 Oe perpendicular to the ABS. Accordingly, if the pinning layer 208 was removed from the spin valve sensor 200 in FIG. 10, the AP pinned layer structure 204 would be self-pinned by a total uniaxial anisotropy field from each AP pinned layer of about 330 Oe. The resistance $R_S$ of the sensor was 23 ohms/sq. and the magnetostriction λ of the free layer structure 206 was −7.64E−07. It is desirable that the magnetostriction of the free layer be negative since this, in combination with compressive stress in the sensor, results in the free layer structure having a magnetostriction uniaxial anisotropy field parallel to the ABS, as shown at 240 in FIG. 10, which stabilizes the free layer.

In a second test of Example 1 the example was tested at the row level for its amplitude output. The amplitude output of the prior art sensor, exemplified by Example 1, was 875 microvolts.

Example 2

Figure 11:
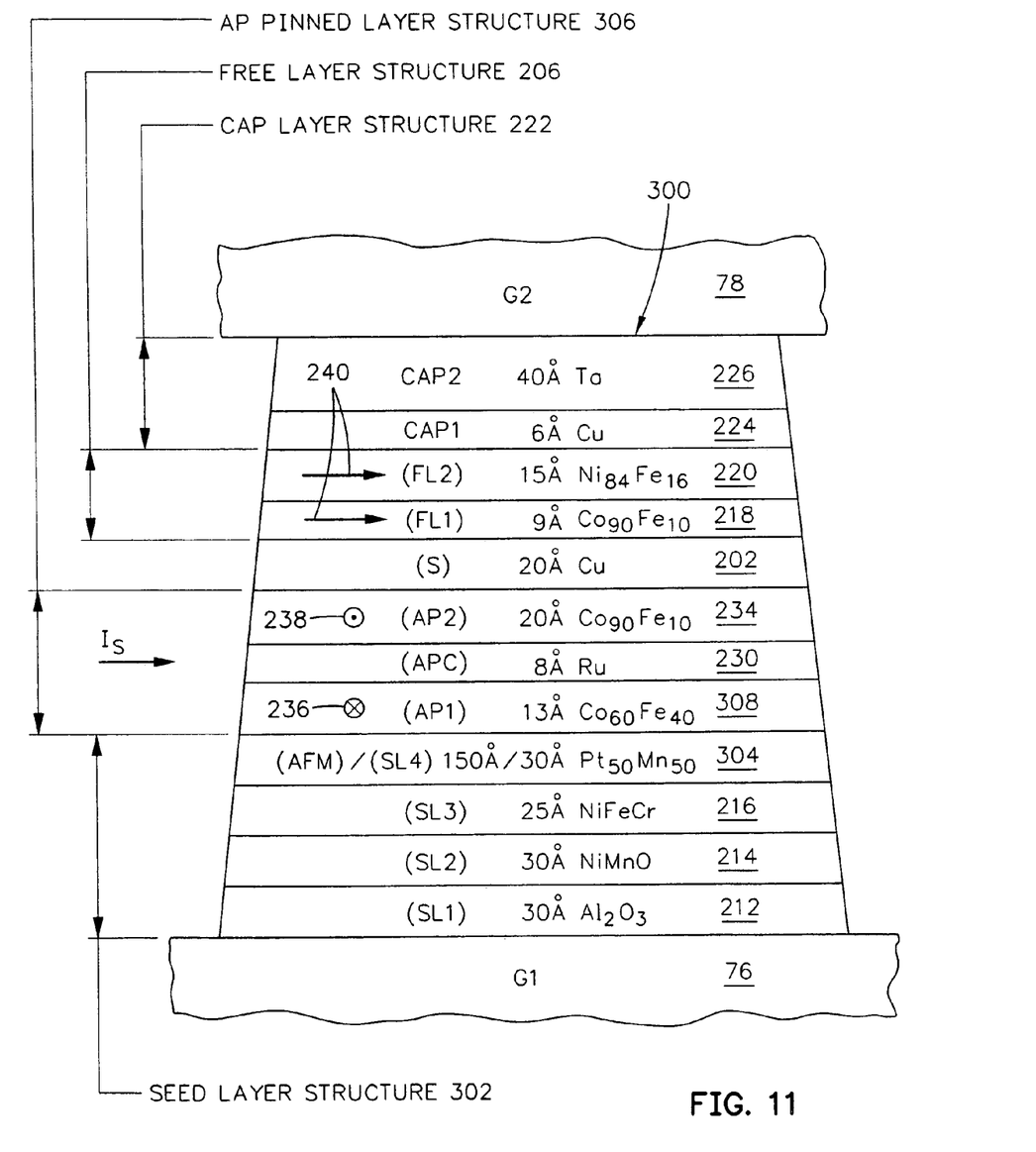
FIG. 11 is an ABS view of a first embodiment of the present spin valve sensor.

In a first experiment involving Example 2 the spin valve sensor 300 in FIG. 11 was tested at the coupon level and differed from the spin valve sensor 200 in FIG. 10 in that the AP pinned layer structure 306 had a first AP pinned layer (AP1) 308 was composed of $Co_{60}Fe_{40}$. The second AP pinned layer 234 stayed the same as the second AP pinned layer 234 in FIG. 10. The layer 304 was kept at 150 Å of $Pt_{50}Mn_{50}$ so as to function as an AFM pinning layer.

The magnetoresistive coefficient dr/R of the sensor 300 was 9.11% which is similar to the magnetoresistive coefficient dr/R of 9.16% for the sensor 200 in FIG. 10. The intrinsic uniaxial anisotropy $H_{Ki}$ for the layers was still about 30 Oe. The magnetostriction λ of the first AP pinned layer 308 was +3.0E−5 which is double the magnetostriction had the layer been $Co_{90}Fe_{10}$. The magnetostriction uniaxial anisotropy field $H_{K\lambda}$ of the AP pinned layer 308 was 500 Oe which is significantly higher than the 300 Oe for the AP pinned layer 232 in the prior art sensor 200 in FIG. 10. Accordingly, the sensor 300 in FIG. 11 can be strongly self-pinned so as to obviate the need for the AFM pinning layer and the magnetoresistive coefficient dr/R will remain high. The magnetostriction λ of the free layer structure 206 was +4.00E−07. The resistance $R_S$ of the sensor was 23.3 ohms/sq.

In a second test of Example 2 at the row level the layer 304 was changed to 30 Å of $Pt_{50}Mn_{50}$, which is significantly below the thickness required to function as a pinning layer, and the sensor was formed with an ABS. After these modifications the AP layer structure was self-pinned. Testing after the modifications showed the sensor to have an amplitude of 1225 microvolts which is 40% higher than the amplitude of the prior art sensor in Example 1. This is a significant improvement in the sensitivity of the sensor because of the self-pinning AP pinned layer structure 306 and the materials employed therein. Without the thick AFM pinning layer there is less sense current $I_S$ shunting and the read gap distance between the first and second shield layers 80 and 82 has been significantly reduced to increase the linear read bit density of the read head.

The direction of the magnetic moment 238, either into or out of the sensor, is determined by the direction in which the magnetic moment is set by an external magnetic field without an elevated temperature. With the arrangement shown in FIG. 11 the magnetic field has been applied out of the sensor which causes the magnetic moment 238 to be directed out of the sensor. If the external field is reversed in its direction the magnetic moment 238 would be directed into the sensor. When the AP pinned layers 308 and 234 are formed by sputter deposition they are deposited in the presence of a field which is oriented perpendicular to the ABS. In this manner, the easy axes of the first and second AP pinned layers will likewise be oriented perpendicular to the ABS.

Example 3

Figure 12:
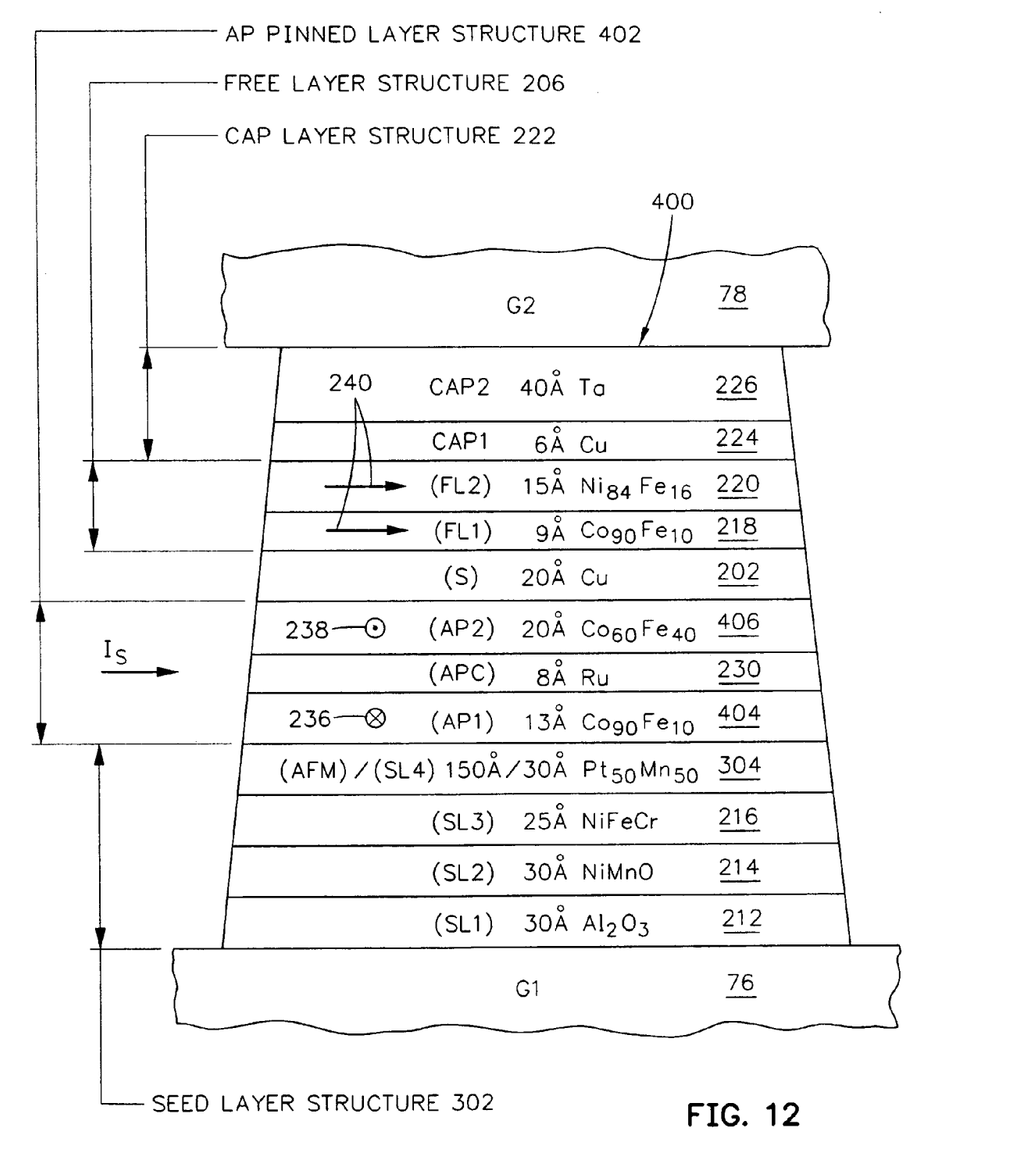
FIG. 12 is an ABS view of a second embodiment of the present spin valve sensor.

The spin valve sensor 400 in FIG. 12, which was tested at the coupon level, was the same as the spin valve sensor 300 in FIG. 11 except the AP pinned layer structure 402 had a first AP pinned layer (AP1) 404 which was composed of 13 Å of $Co_{90}Fe_{10}$ and a second AP pinned layer (AP2) 406 which was composed of 20 Å of $Co_{60}Fe_{40}$. The layer 304 was kept at 150 Å of $Pt_{50}Mn_{50}$ so as to function as a pinning layer and the ABS was not formed.

The magnetoresistive coefficient dr/R of the sensor 300 was 8.07% which s a considerable drop from the 9.11% for the spin valve sensor 200 in FIG. 10. The intrinsic uniaxial anisotropy field $H_{Ki}$ for each AP pinned layers 308 and 234 remained at about 30 Oe, the magnetostriction λ of the first AP pinned layer 308 remained at +3.0E−5 and the magnetostriction uniaxial anisotropy field $H_{K\lambda}$ of the AP pinned layer 406 was about 500 Oe. The magnetostriction λ of the free layer 206 was −7.29E−07. The resistance $R_S$ of the sensor was 21.6 ohms square.

In the invention the layer 304 in FIG. 12 is exemplified by 30 Å of $Pt_{50}Mn_{50}$ so that the layer 304 serves as a seed layer (SL4) and not an AFM pinning layer. Since the AP pinned layer 406 has a $H_{K\lambda}$ which is significantly higher than the $H_{K\lambda}$ of the prior art AP pinned layer 234 in FIG. 10, the AP pinned layer structure 402 in FIG. 12 will be strongly self-pinned.

Example 4

Figure 13:
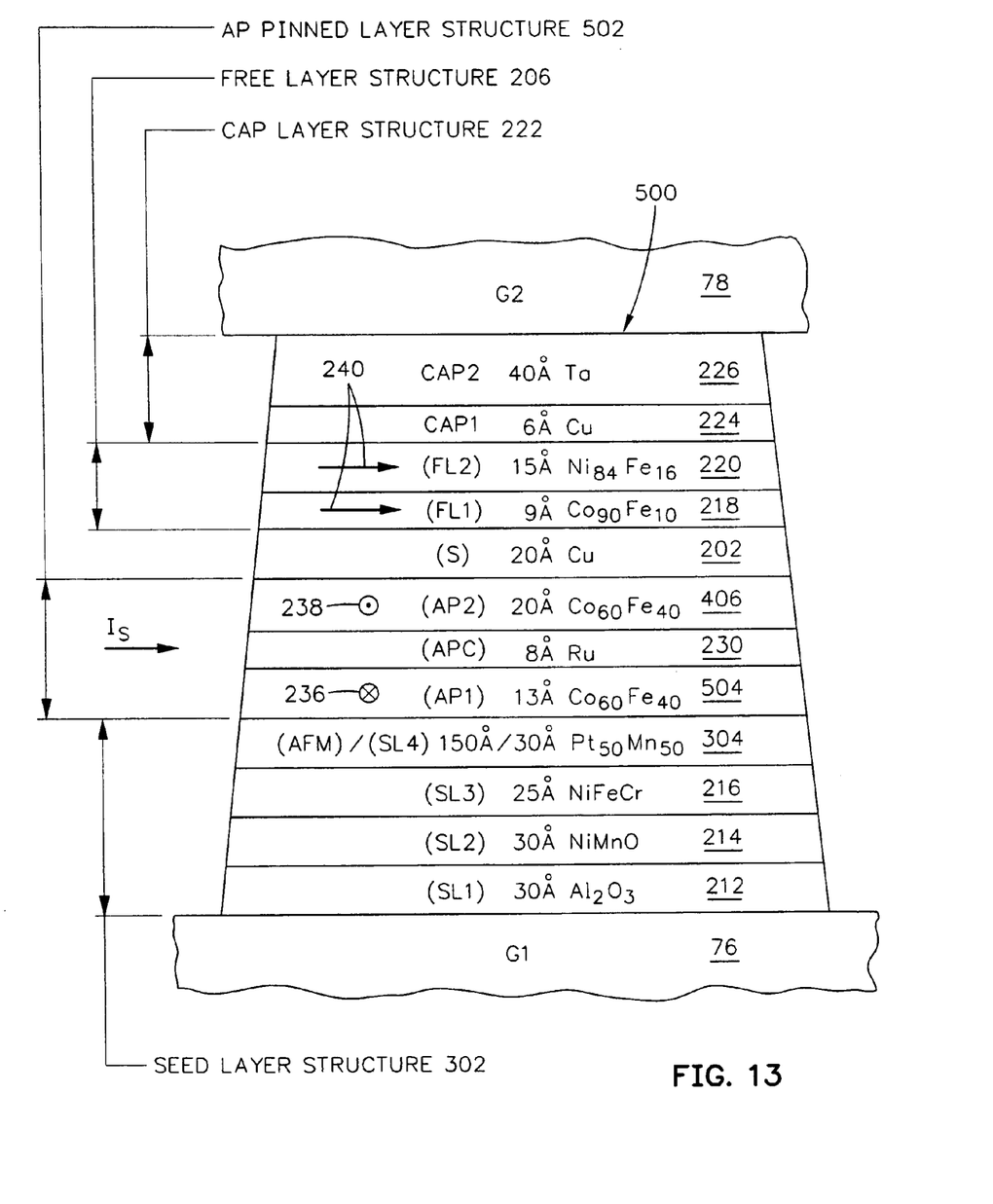
FIG. 13 is an ABS view of a spin valve sensor tested by us.

The spin valve sensor 500 in FIG. 13, which was tested at the coupon level, is the same as the spin valve sensor 400 in FIG. 12 except the AP pinned layer structure 502 has a first AP pinned layer (AP1) 504 which is composed of 13 Å of $Co_{60}Fe_{40}$. The layer 304 was kept at 150 Å of $Pt_{50}Mn_{50}$ so as to function as a pinning layer and the ABS was not formed.

The magnetoresistive coefficient dr/R of the sensor was 8.01% which is a considerable drop from the 9.11% for the sensor 300 in FIG. 11. The intrinsic uniaxial anisotropy field $H_{Ki}$ of the layers remained at about 30 Oe, the magnetostriction λ of each of the layers was +3.0E−5 and the magnetostriction uniaxial anisotropy field $H_{K\lambda}$ of the AP pinned layers 504 and 406 were about 500 Oe. The magnetostriction λ of the free layer structure 206 was −2.58E−07.

In the invention the layer 304 in FIG. 13 is exemplified by 30 Å of $Pt_{50}Mn_{50}$ so that the layer 304 serves as a seed layer (SL4) and not an AFM pinning layer. Since the AP pinned layers 504 and 406 have $H_{K\lambda}$ values of 500 Oe which are significantly higher than the $H_{K\lambda}$ values of the prior art AP pinned layers 232 and 234 in FIG. 10, the AP pinned layer structure 502 in FIG. 13 will be strongly self-pinned.

Example 5

Figure 14:
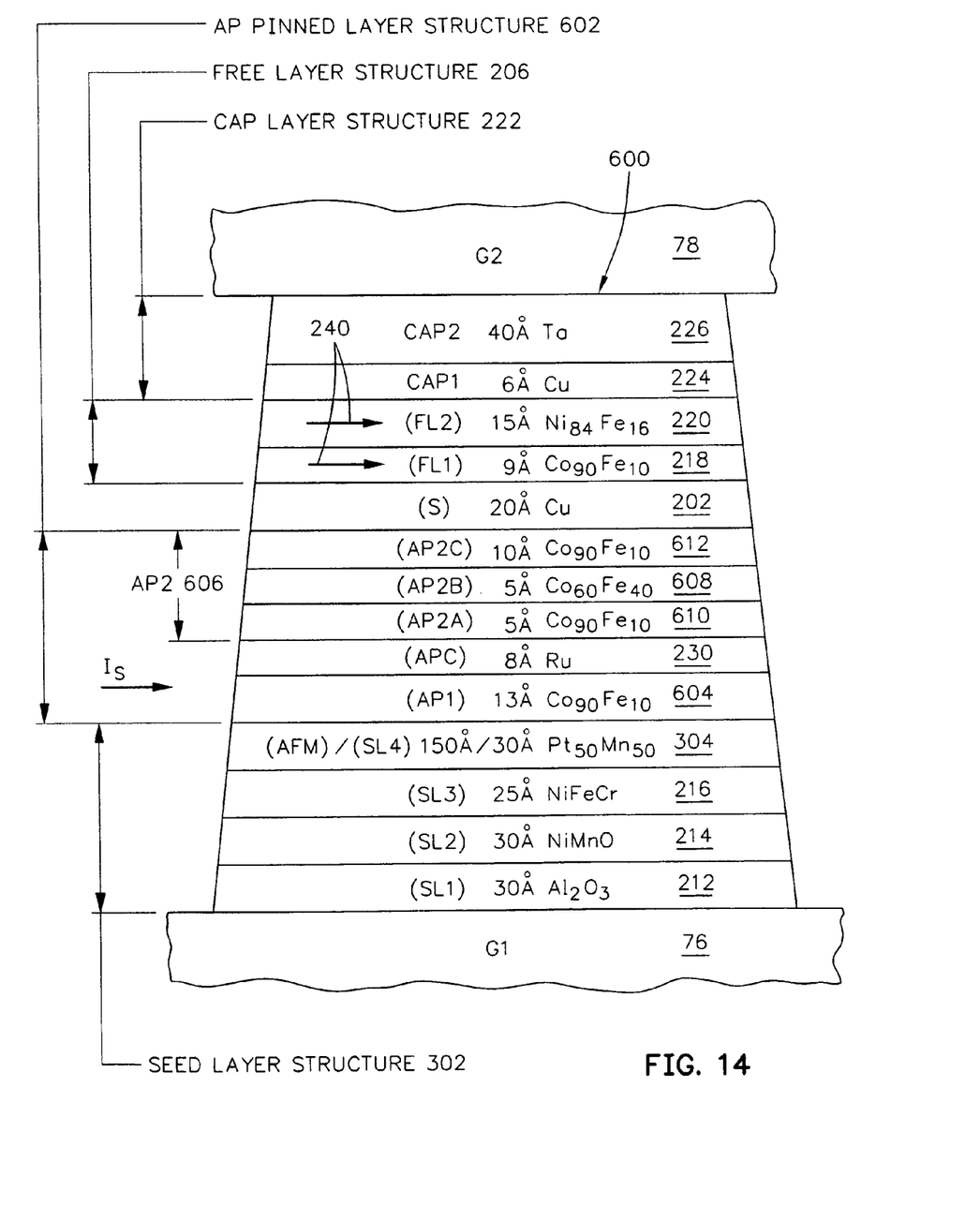
FIG. 14 is an ABS view of a third embodiment of the present spin valve sensor.

The spin valve sensor 600 in FIG. 14, which was tested at the coupon level, is the same as the spin valve sensor 500 in FIG. 13 excerpt the AP pinned layer structure 602 has a first AP pinned layer (AP1) 604 which is composed of 13 Å of $Co_{90}Fe_{10}$ and a second AP pinned layer (AP2) 606 is a lamination. The layer 304 was kept at 150 Å of $Pt_{50}Mn_{50}$ so as to function as a pinning layer and the ABS was not formed. The second AP pinned layer 606 has a second AP pinned film (AP2B) 608 which is located between first and second AP pinned layer films (AP2A) and (AP2C) 610 and 612. The second film 608 is composed of 5 Å of $Co_{60}Fe_{40}$, the first film 608 is composed of 5 Å of $Co_{90}Fe_{10}$ and the third film 610 is composed of 10 Å of $Co_{90}Fe_{10}$. The magnetoresistive coefficient dr/R was 8.91% which is similar to the magnetoresistive coefficient of 9.16% for the spin valve sensor 200 in FIG. 10. The intrinsic uniaxial anisotropy field $H_{Ki}$ for each of the AP pinned layers 604 and 606 was about 30 Oe, the magnetostriction λ of the $Co_{60}Fe_{40}$ was +3.0E−5 and the magnetostriction uniaxial anisotropy field $H_{K1}$ of the AP pinned layer 606 was about 400 Oe. The magnetostriction λ of the free layer structure 206 was −4.07E−07. The resistance $R_S$ of the sensor was 23.4 ohms square.

In the invention the layer 304 in FIG. 14 is exemplified by 30 Å of $Pt_{50}Mn_{50}$ so that the layer 304 serves as a seed layer (SL4) and not an AFM pinning layer. The AP pinned layer 606 will have a $H_{K\lambda}$ of about 400 Oe, which is higher than the $H_{K\lambda}$ of the prior art AP pinned layer 234 in FIG. 10. The AP pinned layer structure 402 in FIG. 12 can be strongly self-pinned.

Example 6

Figure 15:
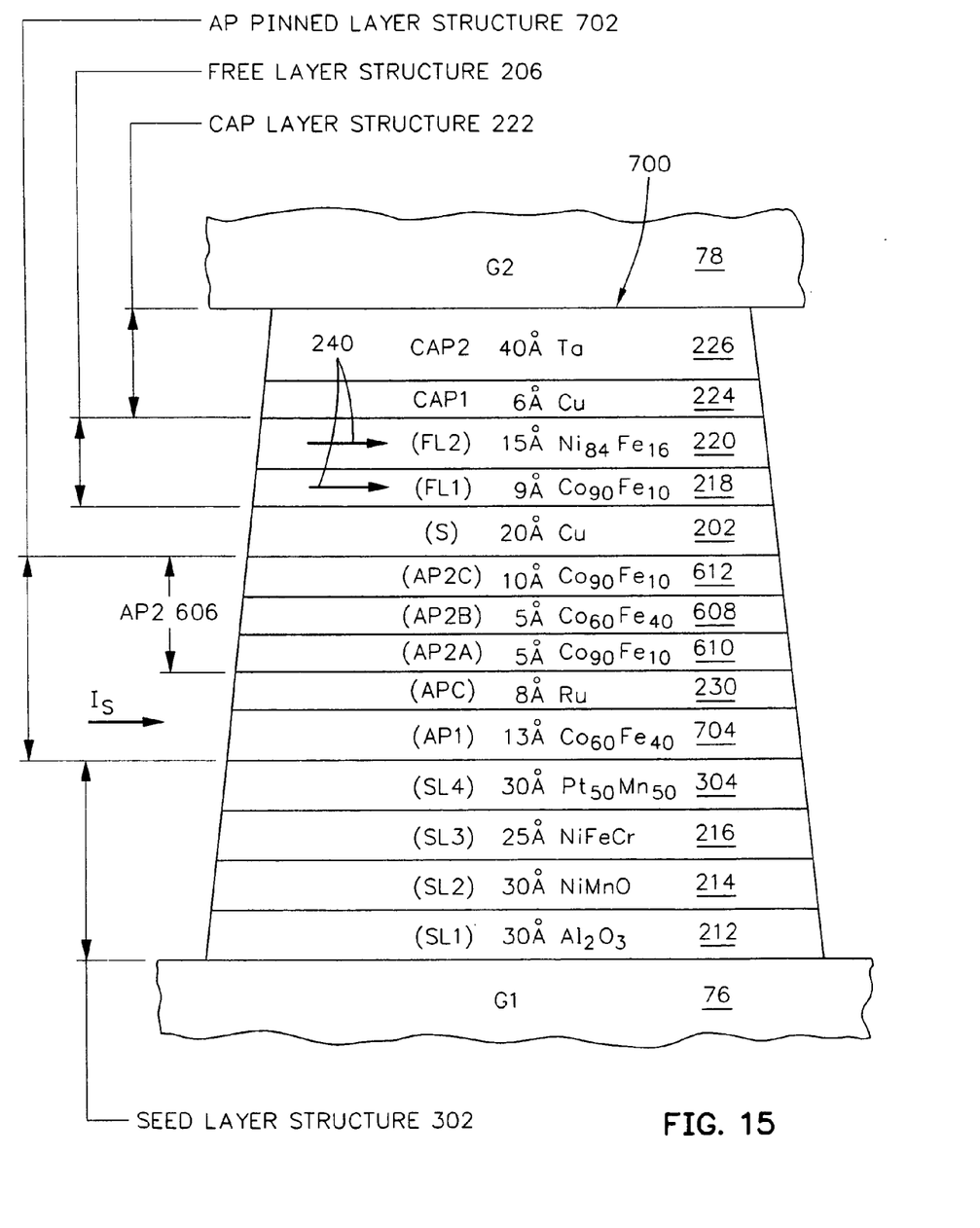
FIG. 15 is an ABS view of a fourth embodiment of the present spin valve sensor.

The spin valve sensor 700 in FIG. 15 is the same as the spin valve sensor 600 in FIG. 14 except the AP pinned layer structure 702 has a first AP pinned layer (AP1) 704 which is composed of 13 Å of $Co_{60}Fe_{40}$. This sensor was not built and tested, however, it combines the attributes of Examples 2 and 5 and is considered to be within the spirit of the invention.

The chart hereinbelow summarizes the results from the Examples described hereinabove.

| | | | $Co_{60}Fe_{40}$ Experiments | | | | |
|---|---|---|---|---|---|---|---|
| Example | Position Inserted | dR/R (%) | $H_{Ki}$ | λ(AP) | $H_{K\lambda}$ | $R_s$ (Ω/sq) | λ(FL) |
| 1 | Prior Art | 9.16 | 30 Oe | +1.5E−05 | 300 Oe | 23.0 | −7.64E−07 |
| 2 | AP1 | 9.11 | 30 Oe | +3.0E−5 | 500 Oe | 23.3 | −4.00E−7 |
| 3 | AP2 | 8.07 | 30 Oe | +3.0E−5 | 500 Oe | 21.6 | −7.29E−07 |
| 4 | AP1/AP2 | 8.01 | 30 Oe 30 Oe | +3.0E−5 +3.0E−5 | 500 Oe 500 Oe | 21.5 | −2.58E−07 |
| 5 | AP2* | 8.91 | 30 Oe | +1.9E−5 | 400 Oe | 23.4 | −4.07E−07 |
| 6 | AP1/AP2* | | | | | | |

*lamination

DISCUSSION

It can be seen from the chart that Example 2 has a dr/R which is comparable to Example 1 while having a significantly higher $H_{K\lambda}$ for self-pinning the AP pinned layer structure. While the self-pinning in Example 3 remains high the dr/Rh has significantly dropped as compared to Examples 1 and 2. A similar result was obtained with Example 4. However, Example 5 had a high self-pinning AP pinned layer structure and a dr/R which is comparable to Example 1. As stated hereinabove, Example 6 is a combination of the desirable attributes of Examples 2 and 5.

While not preferred, it should be understood that the addition of another element in the cobalt iron (CoFe) content of the first and second AP pinned layers does not depart from the spirit of the invention. It should be further understood that the invention can be employed with top spin valves in addition to the bottom spin valves described hereinabove and can also be applied in dual spin valves instead of the single spin valve described hereinabove. It should be further understood that the AP pinned layers may include additional AP pinned layers separated by ruthenium layers instead of the two AP pinned layers separated by one ruthenium layer described hereinabove. All embodiments can be employed in the structures shown in FIGS. 1–9.

The spin valve sensor described herein is a current in plane (CIP) spin valve sensor since the sense current $I_S$ is conducted parallel to the major thin film planes of the sensor as shown in FIGS. 11–15. The inventive concepts described herein also apply to a current perpendicular to the planes (CPP) spin valve sensor where the sense current $I_S$ is conducted perpendicular to the major thin film planes of the sensor. Further, the inventive concepts are applicable to magnetoresistive sensors other than spin valve sensors such as a tunnel junction sensor where a tunneling current is conducted through the sensor in a direction perpendicular to the major thin film planes of the sensor. Still further, the slider supporting the magnetoresistive sensor may have a head surface other than the aforementioned ABS such as a tape surface for use in a tape drive.

The following commonly assigned U.S. Patents are incorporated in their entirety by reference herein: (1) U.S. Pat. No. 5,465,185;(2) U.S. Pat. No. 5,583,725; (3) U.S. Pat. No. 5,768,069; (4) U.S. Pat. No. 6,040,961; (5) U.S. Pat. No. 6,117,50; (6) U.S. Pat. No. 6,127,053; and (7) U.S. Pat. No. 6,219,211 B1.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic head assembly comprising:
   a read head that includes a magnetoresistive sensor
   the magnetoresistive sensor including:
      an antiparallel (AP) pinned layer structure;
      a ferromagnetic free layer having a magnetic moment that is free to rotate in response to a field signal; and
      a spacer layer located between the free layer and the AP pinned layer structure;
   the antiparallel (AP) pinned layer including:
      ferromagnetic first and second antiparallel (AP) layers;
      an antiparallel coupling (APC) layer located between and interfacing the first and second AP pinned layers;
      the first and second AP pinned layers self pinning one another without assistance of an antiferromagnetic (AFM) pinning layer;
      the second AP pinned layer interfacing the spacer;
   wherein the magnetic head assembly includes:
      nonmagnetic electrically nonconductive first and second read gap layers;
      the spin valve sensor being located between the first and second read gap layers;
      ferromagnetic first and second shield layers; and
      the first and second read gap layers being located between the first and second shield layers
   wherein the iron Fe content in the cobalt iron (CoFe) in the second AP pinned layer is greater than the iron (Ge) content in the cobalt iron (CoFe) in the first AP pinned layer.

2. A magnetic head assembly as claimed in claim 1 wherein the second AP pinned layer includes:
   a second film located between first and third films with each film being composed of cobalt iron (CoFe);
   the iron (Fe) content in the cobalt iron (CoFe) in the second film being greater than the iron (Fe) content in the cobalt iron (CoFe) in each of the first and third films.

3. A magnetic head assembly as claimed in claim 2 wherein the second film comprises $Co_{60}Fe_{40}$ and each of the first and third films comprises $Co_{90}Fe_{10}$.

4. A magnetic head assembly as claimed in claim 2 wherein the first AP pinned layer comprises $Co_{60}Fe_{40}$.

5. A magnetic head assembly as claimed in claim 4 wherein the second film comprises $Co_{60}Fe_{40}$ and each of the first and third films comprises $Co_{90}Fe_{10}$.

6. A magnetic disk drive including at least one magnetic head assembly that has a head surface and that includes a write head and a read head, comprising:
   the write head including;
      ferromagnetic first and second pole piece layers that have a yoke portion located between a pole tip portion and a back gap portion;
      a nonmagnetic write gap layer located between the pole tip portions of the first and second pole piece layers;
      an insulation stack with at least one coil layer embedded therein located between the yoke portions of the first and second pole piece layers; and
      the first and second pole piece layers being connected at their back gap portions;
   the read head including a magneto resistive sensor;
   the magneto resistive sensor including:
      an antiparallel (AP) pinned layer structure; a ferromagnetic free layer having a magnetic moment that is free to rotate in response to a field signal; and
      a spacer layer located between the free layer and the AP pinned layer structure;
   the antiparallel (AP) pinned layer structure including:
      ferromagnetic first and second antiparallel (AP) pinned layers;
      an antiparallel coupling (APC) layer located between and interfacing the first and second AP pinned layers;
      the first and second AP pinned layers self pinning one another without assistance of an antiferromagnetic (AFM) pinning layer;;
      the second AP pinned layer interfacing the spacer layer; the iron (Fe) content in the cobalt iron (CoFe) of one of the first and second AP pinned layers being greater than the iron (Fe) content in the cobalt iron (CoFe) in the other of the first and second AP pinned layers; a housing;
   a magnetic medium supported in the housing;
   a support mounted in the housing for supporting the magnetic head assembly with said head surface facing the magnetic medium so that the magnetic head assembly is in a transducing relationship with the magnetic medium;
   a motor for moving the magnetic medium; and
   a processor connected to the magnetic head assembly and to the motor for exchanging signals with the magnetic head assembly and for controlling movement of the magnetic medium;
   wherein the iron (Fe) content in the cobalt iron (CoFe) in the second AP pinned layer is greater than the iron (Fe) content in the cobalt iron (CoFe) in the first AP pinned layer.

7. A magnetic disk drive as claimed in claim 6 wherein the second AP pinned layer includes:
   a second film located between first and third films with each film being composed of cobalt iron (CoFe);
   the iron (Fe) content in the cobalt iron (CoFe) in the second film being greater than the iron (Fe) content in the cobalt iron (CoFe) in each of the first and third films.

8. A magnetic disk drive as claimed in claim 7 wherein the second film comprises $Co_{60}Fe_{40}$ and each of the first and third films comprises $Co_{90}Fe_{10}$.

9. A magnetic disk drive as claimed in claim 7 wherein the first AP pinned layer comprises $Co_{60}Fe_{40}$.

10. A magnetic disk drive as claimed in claim 9 wherein the second film comprises $Co_{60}Fe_{40}$ and each of the first and third films comprises $Co_{90}Fe_{10}$.

* * * * *

UNITED STATES PATENT AND TRADEMARK OFFICE
CERTIFICATE OF CORRECTION

PATENT NO. : 7,082,017 B2
APPLICATION NO. : 10/833213
DATED : July 25, 2006
INVENTOR(S) : James Mac Freitag et al.

Page 1 of 1

It is certified that error appears in the above-identified patent and that said Letters Patent is hereby corrected as shown below:

Column 11, Claim 1, Line 35 after "spacer" insert --layer--
Column 11, Claim 1, Line 44 change "Fe)" to --(Fe)--
Column 11, Claim 1, Line 45 change "(Ge)" to --(Fe)--
Column 12, Claim 6, Line 11 change "magneto resistive" to --magnetoresistive--
Column 12, Claim 6, Line 12 change "magneto resistive" to --magnetoresistive--

Signed and Sealed this

First Day of December, 2009

David J. Kappos
*Director of the United States Patent and Trademark Office*